US005983351A

United States Patent [19]
Glogau

[11] Patent Number: 5,983,351
[45] Date of Patent: Nov. 9, 1999

[54] WEB SITE COPYRIGHT REGISTRATION SYSTEM AND METHOD

[75] Inventor: Jordan J. Glogau, Nanuet, N.Y.

[73] Assignee: Intellectual Protocols, L.L.C., Nanuet, N.Y.

[21] Appl. No.: 08/951,371

[22] Filed: Oct. 16, 1997

Related U.S. Application Data

[60] Provisional application No. 60/028,826, Oct. 16, 1996.

[51] Int. Cl.$^6$ ..................................................... G06F 11/00
[52] U.S. Cl. ........................... 713/201; 707/500; 707/505
[58] Field of Search ..................................... 713/200, 201; 380/3, 4; 707/505, 506, 507, 508, 500

[56] References Cited

U.S. PATENT DOCUMENTS

| | | | |
|---|---|---|---|
| 4,346,442 | 8/1982 | Musmanno | 364/408 |
| 5,640,501 | 6/1997 | Turpin | 395/768 |
| 5,737,619 | 4/1998 | Judson | 395/761 |
| 5,754,763 | 5/1998 | Bereiter | 395/187.01 |
| 5,758,069 | 5/1998 | Olsen | 395/187.01 |
| 5,761,499 | 6/1998 | Sonderegger | 395/610 |
| 5,765,152 | 6/1998 | Erickson | 707/9 |
| 5,850,480 | 12/1998 | Scanlon | 382/229 |
| 5,867,579 | 2/1999 | Saito | 380/25 |

FOREIGN PATENT DOCUMENTS

| | | | |
|---|---|---|---|
| 08190545 | 7/1996 | Japan | G06F 17/21 |

*Primary Examiner*—Robert W. Beausoliel, Jr.
*Assistant Examiner*—Scott T. Baderman

[57] ABSTRACT

A web site copyright registration system and method is accomplished via a computer system that examines a web site or other work and produces completed copyright registration forms and associated materials (e.g., a copy of the web site and additional copies of selected individual web site components) to register the web site and selected individual web site components for copyright protection. The computer system, via software, receives copyright information related to the web site from a user and examines the web site to identify individual web site components contained within the web site and to ascertain component information related to each identified web site component. The user is queried by the computer system for each identified web site component to select web site components for inclusion in the web site registration. Further, the user may select identified web site components for individual copyright protection. The computer system stores the copyright and component information and information related to user selection of identified web site components in data structures and/or a database. The stored information is utilized by the computer system to produce the appropriate completed copyright registration forms and associated materials (e.g., copies of the web site components selected by the user for inclusion in the web site registration, and copies of the web site components selected by the user for individual protection) to register the web site and selected individual web site components (i.e., the web site components selected by the user for individual protection) for copyright protection.

22 Claims, 10 Drawing Sheets

```
<HTML>
<HEAD>
<TITLE> IMAGE PROTECTION APPLET </TITLE>
</HEAD>
<BODY>
<CENTER> <h1> IMAGE PROTECTION APPLET</h1> </CENTER>
<p>
THE EXAMPLE BELOW SHOWS HOW THE IMAGE PROTECTION APPLET WORKS FOR
IMAGES
BEING IMPLEMENTED VIA MOST SECURE METHOD,NAMELY VIA
AN APPLET.
</p>
<p>
THE IMAGE IS STORED AND TRANSMITTED IN ENCRYPTED FORM,
AND IF IT'S INTERCEPTED,WILL HAVE TO BE DECODED. SPECIAL
PROVISIONS ARE MADE TO PROVIDE (C) NOTICE AND CORRESPONDING
WARNINGS IN THE BODY OF THE IMAGE.
</p>
<p>
ONLY THE APPLET DOWNLOADED FROM THE    SERVERS CAN DECODE
IMAGE AND SHOW IT APPROPRIATELY. WHENEVER USER MOVES TO THE
IMAGE AREA AND/OR CLICKS THERE, HE'LL RECEIVE EXPLICIT (C)
NOTICE IN HIS/HER BROWSER WINDOW.
</p>
<p>
THE APPLET TAKES WIDTH/HEIGHT OF THE IMAGE, BACKGROUND COLOR
AND (C) MESSAGE. IMAGES CAN BE ALIGNED IN FULL ACCORDANCE
WITH APPLET ALIGNMENT TAGS ETC.
</p>
<APPLET CODE="CIMAGE.CLASS" WIDTH=100 HEIGHT=100>
<PARAM NAME=IMAGENAME VALUE=TEST.GIF>
<PARAM NAME=WIDTH VALUE=100>
<PARAM NAME=HEIGHT VALUE=100>
<PARAM NAME=CNOTICE VALUE="THIS IMAGE IS (C) BY     ">
<PARAM NAME=BGCOLOR VALUE=FFFFFF>
</APPLET>
</BODY>
</HTML>
```

WEB SITE COPYRIGHT REGISTRATION SYSTEM AND METHOD

CROSS REFERENCE TO RELATED APPLICATIONS

This application claims priority from U.S. Provisional Patent Application Ser. No. 60/028,826, entitled "Web Site Copyright Registration System and Method", filed Oct. 16, 1996. The disclosure of that provisional patent application is incorporated herein by reference in its entirety.

BACKGROUND OF THE INVENTION

1. Technical Field

The present invention pertains to computer systems for assisting owners in registering their works for copyright protection. In particular, the present invention is directed toward a computer system for analyzing an Internet web site and automatically generating completed copyright registration forms and associated materials (e.g., a copy of the web site and additional copies of user selected individual web site components) to register the web site and user selected individual web site components for copyright protection.

2. Discussion of the State of the Art

Briefly, the growth of the World Wide Web (herein referred to as the Web) has been an unprecedented event in the history of computers and telecommunications. Internet traffic has increased from five terabytes (i.e., $10^{12}$ or trillion) a day in the fall of 1994 to 250 terabytes a day in the summer of 1996. Further, personal computer sales will surpass television sales in the United States for the first time in 1996, while data telecommunications traffic will similarly overtake voice traffic. Most of these events can be attributed to the growth of the Internet and the Web.

Although the Web is a wonderful environment to transact business and disseminate information, there are a number of disadvantages that make it unattractive. Specifically, there is typically no provision on the Internet, and the Web in particular, to protect material from being indiscriminately copied and reproduced with impunity. Since the act of transferring files from one computer to another involves substantially exact reproduction of the material, it is difficult to protect that material from unauthorized use. The traditional publishing industry utilizes copyright law to protect printed material, and this same protection can extend to web sites and certain web site components. In order to simplify copyright registration for web site owners desiring copyright protection for their web sites, the present invention converts a web site into the proper format and generates the appropriate completed copyright registration forms and associated materials (e.g., a copy of the web site and additional copies of user selected individual web site components) to register the web site and user selected individual web site components for copyright protection with the appropriate authority (e.g., the Copyright Office).

OBJECTS AND SUMMARY OF THE INVENTION

Accordingly, it as an object of the present invention to simplify copyright registration of web sites or other various works by automatically generating completed copyright registration forms and associated materials (e.g., copies of the works) to register the works for copyright protection.

It is another object of the present invention to examine a web site and automatically generate the appropriate completed copyright registration forms and associated materials (e.g., a copy of the web site) to register the web site for copyright protection.

Yet another object of the present invention is to examine a web site and automatically generate the appropriate completed copyright registration forms and associated materials (e.g., a copy of the web site and additional copies of user selected individual web site components) to register the web site and user selected individual web site components for copyright protection.

The aforesaid objects are achieved individually and in combination, and it is not intended that the present invention be construed as requiring two or more of the objects to be combined unless expressly required by the claims attached hereto.

According to the present invention, a web site copyright registration system and method is accomplished by a computer system that, via software, examines a web site or other work and generates the appropriate completed copyright registration forms and associated materials (e.g., a copy of the web site and additional copies of user selected individual web site components) to register the web site and user selected individual web site components for copyright protection. Specifically, the computer system preferably includes a processor, memory (e.g., RAM and hard drive), input devices (e.g., keyboard, mouse, etc.) and monitor, and has access to a web site. Initially, copyright information associated with the web site is received by the computer system from a user via the input devices. The computer system subsequently examines the web site to determine the web site structure and identify various web site components. The web site components may be different types of works (e.g., text, photograph, audio) wherein the computer system determines the type of work of each identified web site component based on inspection of various tags within web site files and/or file extensions of web site component files (e.g., a 'pg' file extension typically indicates that a file contains a photograph). The work type determination enables the computer system to determine the appropriate copyright registration forms to generate to individually register web site components for copyright protection as described below. Further, since copies of web site components may be generated from the content and/or graphics of web site component files, the computer system utilizes the work type of each web site component to determine the proper manner (i.e., whether to utilize the content and/or graphics of the web site component file) in which to generate a copy of that web site component to register the web site and individual web site component (i.e., if selected by the user for individual copyright protection as described below) for copyright protection.

After identifying and determining work types of web site components, the computer system queries the user for each identified web site component to enable the user to select that web site component for inclusion in the web site copyright registration. In addition, the user may select to individually register that web site component for copyright protection. The copyright information and other information relating to each web site component (e.g., whether or not individual copyright registration is desired for the web site component and the appropriate copyright registration forms to generate for the web site component, the type of work of the web site component, the manner in which to generate a copy of the web site component, etc.) are stored in data structures and/or a database. The computer system generates the appropriate completed copyright registration forms and associated materials (e.g., copies of the web site components selected by the user for inclusion in the web site copyright registration, and copies of web site components selected by the user for individual copyright protection) in accordance with the stored information to register the web site and user selected web site components (i.e., selected by the user for individual copyright protection) for copyright protection.

The above and still further objects, features and advantages of the present invention will become apparent upon consideration of the following detailed description of a specific embodiment thereof, particularly when taken in conjunction with the accompanying drawings wherein like references numerals in the various figures are utilized to designate like components.

DESCRIPTION OF THE PREFERRED EMBODIMENTS

Figure 1:
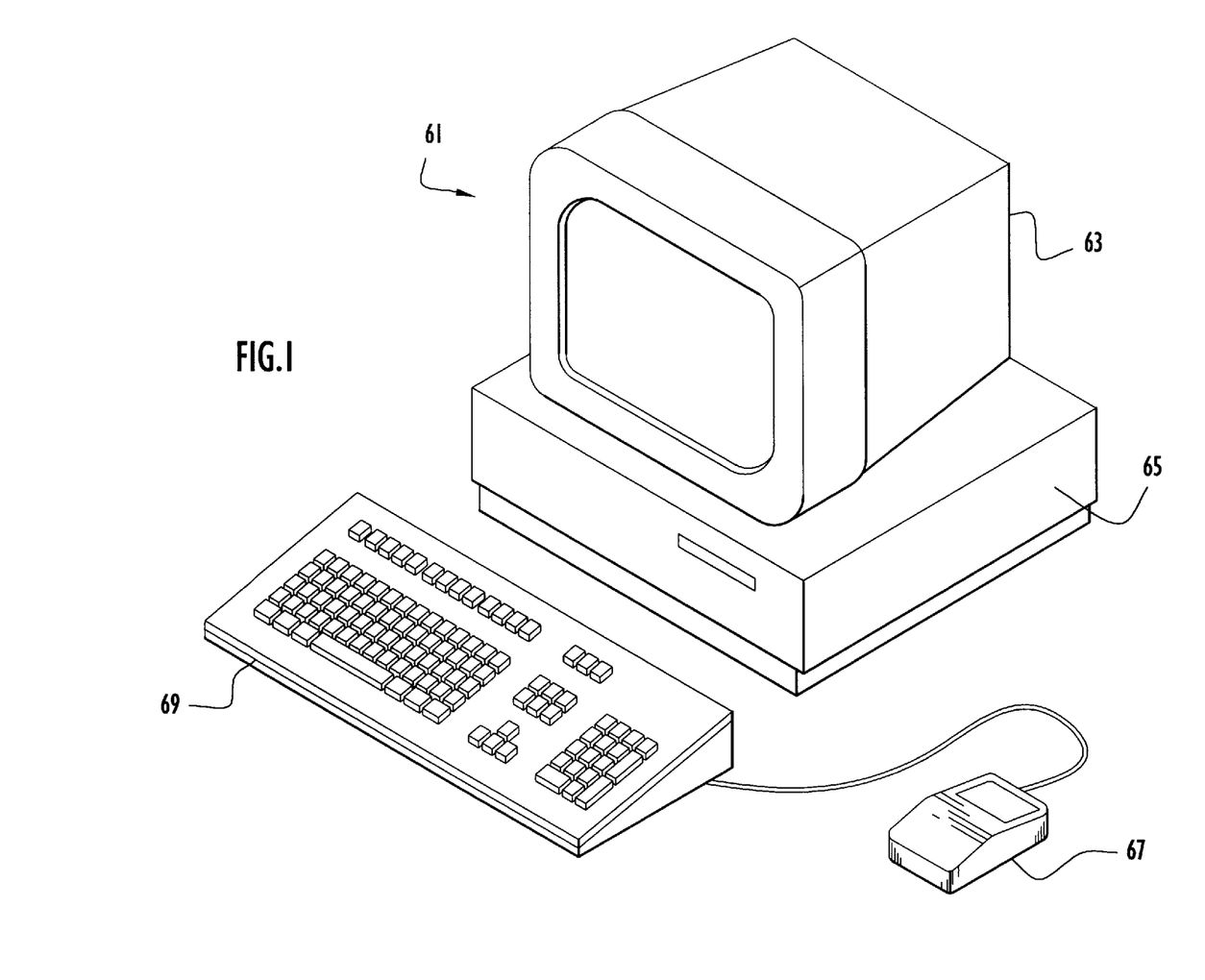
FIG. 1 is a view in perspective of an exemplary computer system implementing the present invention.

An exemplary computer system for implementing web site copyright registration is illustrated in FIG. 1. Specifically, computer system 61 is a conventional IBM-compatible or other type of personal computer preferably equipped with a monitor 63, base 65 (i.e., including the processor, memories, and internal or external communication devices or modems), keyboard 69 and mouse 67. Computer system 61 includes copyright registration software to enable the computer system to assist users with registration of a web site or other various works with the appropriate authority (e.g., the Copyright Office). The computer system may utilize any of the major platforms or operating systems used by a web server (i.e., a computer system that processes user or client requests), such as Windows, Macintosh, Unix or OS2. Further, the system includes at a minimum an Intel 80486 or compatible processor, eight megabytes of RAM, and sufficient disk storage (e.g., hard drive) to store a web site in an uncompressed format, a web browser and other software (e.g., the copyright registration software). These minimum system requirements are necessary in order for the system to effectively execute the copyright registration software. Computer system 61 enhances copyright registration of Internet web site(s) by assisting users with the performance of the following steps to register their web sites with the appropriate authority (e.g., the Copyright Office).

1. Load the copyright registration software into the client's (i.e., user's) computer system.
2. Copy the client's web site including its links (i.e., make a working copy of the web site for processing).
3. Determine the web site source (e.g., sound, text, image in binary form etc.) and graphics (i.e., files that contain pictorial image information) files that are required to be included in the copyright filing.
4. Format the "packaged" web site (i.e., web site components) for filing.
5. Generate the correct Copyright Office forms (e.g., Form TX).
6. Output the web site and forms in correct order on a printer or other output medium (e.g., CD-ROM, diskette).

Figure 2:
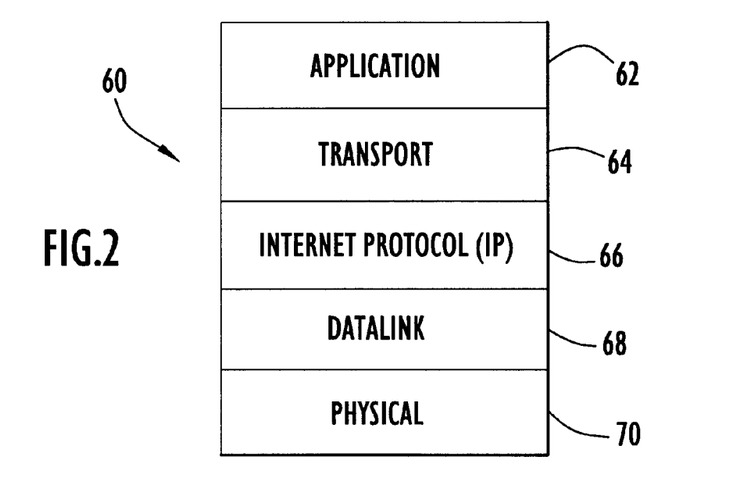
FIG. 2 is a block diagram of the TCP/IP protocol layers.

Briefly, the Web is a Client-Server service (i.e., a service wherein a computer system or server processes requests from several client or user computers) that executes at the top of the Transmission Control/Internet (TCP/IP) protocol layers 60 as illustrated in FIG. 2. The protocol layers dictate the manner in which computers communicate with each other as described below. The TCP/IP layers are less complex than the standard IOS model (i.e., another standard layered protocol) and have become the worldwide standard for communications among different computer systems. Specifically, the Internet Protocol, Datalink, and Physical layers 66, 68, 70 are associated with the physical transfer of data across different media, such as modem, dedicated T1 (i.e., a communication scheme for digital transmission) or LAN (i.e., local area network), and the manner in which the different media handshake or communicate. Transport layer 64 includes a Hypertext Transport Protocol (HTTP) that enables the Web to request and send data from one computer to another, while Application level 62 includes a web browser (i.e., software that enables a user Lo traverse the Web), such as Netscape, Mosaic, Internet Explorer or other browser, residing on the client (i.e., user) system and a web server (i.e., software that enables the server to process client requests) residing on the server system. An end-user at a client system typically enters an Internet address in the appropriate field on a web browser window to request or visit a particular Internet web site. The entered address usually contains the prefix "http" and is forwarded to an Internet service, namely Domain Name Service (DNS), wherein the service stores the computer address of the computer, typically a server, containing the requested site. The request is then sent to the server residing at the computer address and containing the requested site wherein the server downloads the site to the end-user computer via the Internet. The site is then displayed on the end-user computer screen using the client web browser.

Figure 3:
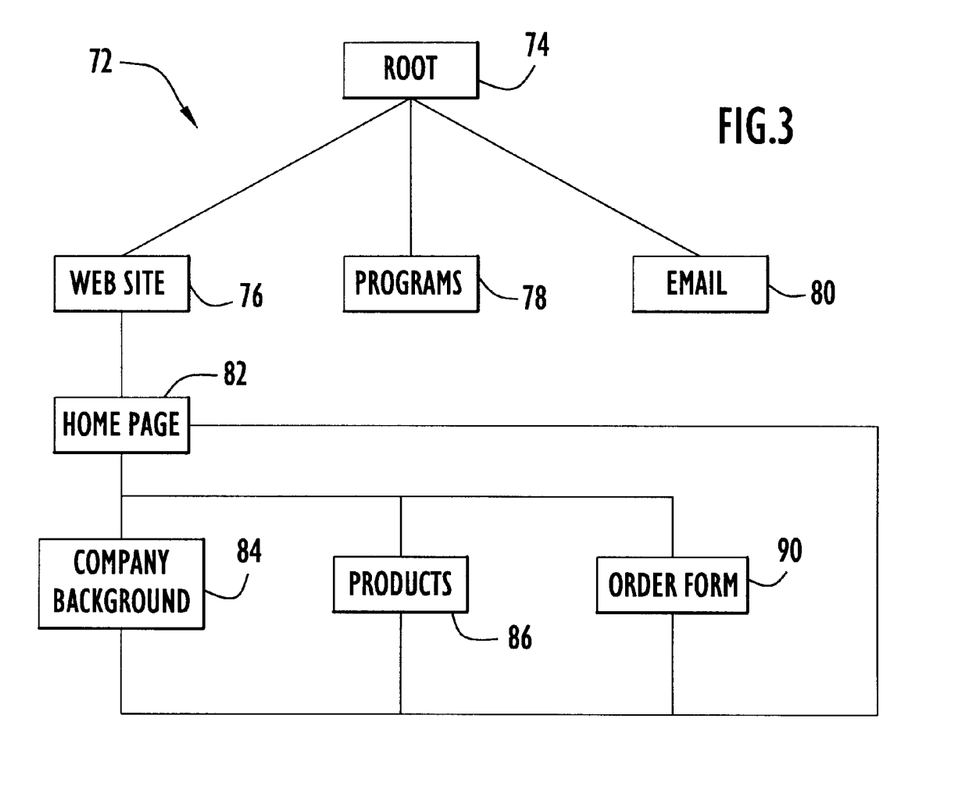
FIG. 3 is a block diagram of an exemplary hierarchical structure of a web site.

The structure of a web site is based on the standard tree structure utilized by most major and conventional computer operating systems. A typical hierarchical structure 72 utilized in conventional computer operating systems and demonstrating the manner in which a majority of web sites are stored within those operating systems is illustrated in FIG. 3. A simple web site can consist of a single file, but generally a web site contains many files. Specifically, structure 72 includes a top level or root node 74 having subordinate nodes 76 (web site), 78 (programs) and 80 (E-mail (i.e., electronic mail)). Programs node 78 includes programs (e.g., common gateway interface (CGI) scripts that reside on the server and are initiated by the web browser via user input) utilized by the web site to perform various functions, such as animation, while E-mail node 80 typically contains information relating to the transmission and reception of electronic mail. Web site node 76 typically includes a subordinate node pertaining to a home page 82 with links to subsequent nodes or pages of information, such as company background 84, products 86 and order forms 90. These links are known as Hyperlinks and are a powerful utility of the Web enabling transference to various web pages. The links also enable return from company background, products, and order form pages 84, 86, 90 to the home page 82 (i.e., commonly referred to as the index since the home page enables transference to particular locations in the web site, such as the company background, products and order form pages) such that a user can easily restart traversal of the web site structure. Hyperlinks are not limited to transference among locations within one's own site, but can transfer a user to any other page residing on the Web. Hyperlinks are similar to references and/or footnotes encountered in written works except that the reference is available without having to leave the main body of the work. Further, a web site may have Hyperlinks to other Internet services, such as E-mail and File Transfer Protocol (FTP). FTP is typically utilized to transfer files and download software. In addition, a web site may include forms where a user enters information on the form and the web site interacts with the user via a CGI script described above or other programming protocols.

Figure 4:
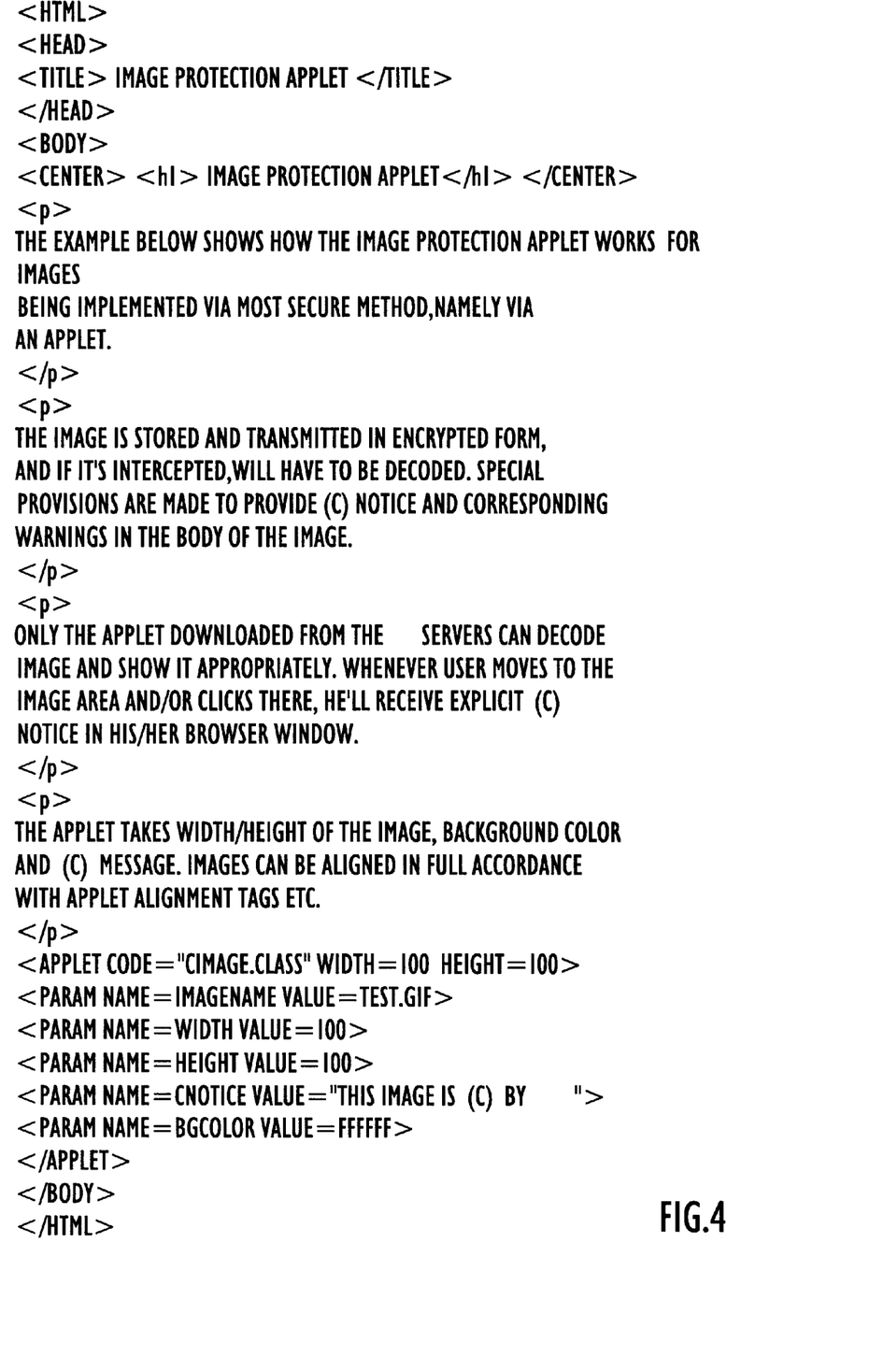
FIG. 4 is an exemplary Hypertext Markup Language (HTML) file containing tags (i.e., web site formatting instructions) for generating a web site page.

The web site files are written in accordance with a particular syntax that is central to the Web, namely the Hypertext Markup Language (HTML). HTML is a language constructed of text that has delimiter codes incorporated into the language to represent a procedural call. These procedural calls indicate the type of processing and/or arrangement for the text, graphic and related objects that form the web site. In particular, HTML utilizes the less than (i.e., "<") and greater than (i.e., ">") symbols as code delimiters with the HTML instructions or tags placed between these two symbols (e.g., <TITLE>). A small exemplary HTML file showing the different types of tags that indicate whether or not the text is body matter, a heading or a title is illustrated in FIG. 4. Other tags include links and calls to graphics, sound files and programs (e.g., CGI scripts). The tags enable the copyright registration system to identify the various objects within a web site and prepare the objects for copyright registration filing as described below.

Basically, a web site is a multimedia product that is formatted for storage in a digital medium. This format is preferred since the appropriate copyright registration authority (e.g, the Copyright Office) typically expects to receive copyright Form TX, wherein that form permits submission of the registerable work in the digital medium format for copyright registration. However, a web site may include several types of media (e.g., images, sound recordings etc.) wherein each web site component or medium may be eligible for individual copyright registration via filing of different copyright forms described below. The decision to file for individual copyright registrations may be influenced by whether or not the individual media or components are used in another environment. When the individual media are used repeatedly in another environment, then the individual media should be considered for copyright registration. However, the determination of individual copyright registration is mostly a business decision on the part of the end-user. The type of form utilized for copyright registration is dependent upon the type of the medium as illustrated below, by way of example only, in Table I.

Web sites typically include a plurality of the various media types described in Table I, however, web site media generally take the form of the works that are listed, by way of example only, in Table II below. For example, graphic works are considered to be pictorial and copyright registration is generally accomplished via form VA, while text and tables are considered to be literary material and copyright registration is generally obtained via form TX. The various types of works shown in Table II are typically contained in files preferably having the designated file extensions (i.e., NA indicates that there is no designated extension or an extension is not applicable). The web site includes software that can process the files to attain the desired effect (e.g., sound,

TABLE I

| TYPE OF WORK | COPYRIGHT OFFICE FORM |
| --- | --- |
| Literary material including computer programs | TX |
| Pictorial or cartographic material | VA |
| Audiovisual material, music or lyrics | PA |
| Sound recording | SR |
| A single issue of a serial | SE |
| Group of issues of a serial | SE/GROUP |
| Group of daily newspapers | GD/N |

TABLE II

| TYPE OF WORK | NAME | FILE EXTENSION | COPYRIGHT FORM REQUIRED FOR FILING |
| --- | --- | --- | --- |
| Text, Tables | HTML | htm or html | TX |
| Graphic | GIF | gif | VA |
| Photograph | JPEG | jpg or jpeg | VA |
| Audio | Wave | wav | SR |
| Digital Music | Midi | mid | PA |
| Audio Streaming | Real Audio | NA | PA |
| Multimedia | Shockwave | NA | PA |
| Program | Java | java | TX |
| Program (Forms) | CGI | cgi | TX |
| FTP (File Transfer) | NA | NA | TX |
| Computer Animation | NA | NA | VA | picture etc). The various web site works described above may require separate copyright registration dependent upon their commercial value as described above.

The registration computer system performs an initial examination of the web site and classifies the various web site components into the media types or objects typically contained in Table II. A subsequent detailed examination is performed on each component to obtain relevant copyright registration options from the user (e.g., separate filing indications) for that type of component. Initially, an end-user is prompted for the address of the web site, and typically enters the Uniform Resource Locator (URL, i.e., the web site internet address) for the web site into a dialog box or form shown on the computer system display to start the copyright registration process. The registration computer system retrieves and examines the whole web site structure 72 (FIG. 3) including the tags found in the web site HTML files (FIG. 4) to identify and classify the various web site components. The HTML tags may indicate the media types of, and usually indicate the files containing, web site components (e.g., image files, sound files, etc.). The file extensions of the web site media files may also indicate the media types as described above in Table II. Subsequently, a series of questions is presented on the computer system display by line prompts or in a dialog box or form relating to the inclusion and exclusion of web site components for copyright registration. In addition, certain graphics of a utility nature should be ignored and are automatically excluded from copyright registration by the system, such as bullets for bulleted lists and simple lines that are used as dividers on the screen. These utility graphics can be excluded based on either their size (e.g., number of bytes and/or length and width) and/or title. Further, a series of graphics, such as clip art (i.e., graphics that have been obtained from a third party), known to have a certain type of file name, can also be ignored and automatically excluded from copyright registration by the system. The system typically sets an ignore flag (i.e., "Ignore Flag" element of an HTML object data structure described below) in order to bypass web site components that are to be ignored. After the web site components have been identified, each web site component included for copyright registration is examined, and the user is presented with copyright filing options (e.g., indicating a separate filing) relevant for the specific type (e.g., Table II) of component. The options may be displayed by line prompts or in a dialog box or form as described above, and selected in either a batch (i.e., typically a file containing responses to inquiries) or interactive (i.e., entering a response via mouse, keyboard or other input device upon display of an inquiry) mode.

The registration computer system utilizes an overall data structure for copyright information and another data structure containing information for the web site itself. The copyright information contains the data required to file the correct forms with the appropriate authority (e.g., the Copyright Office), such as TX for text and VA for visual. The web site information data structure includes a series of sub-records that decompose the site into its smaller components. This decomposition is necessary since different site components may require different forms to be filed, a site component may further include sub-components that are not eligible for copyright protection, or the owner may desire to maintain a portion of a site as a trade secret and exclude that portion from registration. The desire to maintain a site portion as a trade secret usually arises with software programs. Since a site typically includes multiple components, each component must be examined for content and processed according to its type classification (e.g., Table II) and the requirements of both the owner and appropriate authority (e.g., the Copyright Office). For example, a program may display a series of illustrations for the purpose of showing an animated picture. The program controlling the animation (i.e., such as Java or Perl) may not be included in the copyright filing because the program is owned by a third party. However, the illustrations may be filed with the rest of the site or individually by typically filing a separate Form VA.

Figure 5:
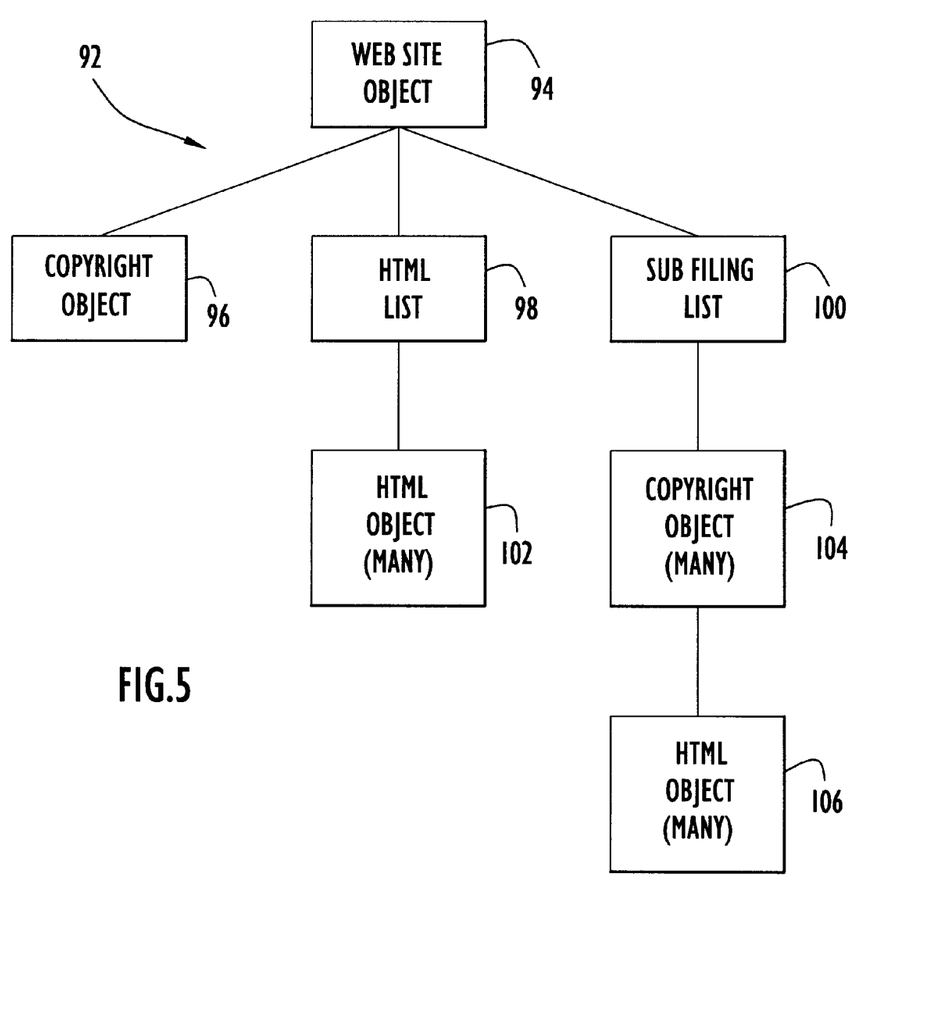
FIG. 5 is a block diagram of an exemplary data structure utilized by the registration computer system for storing a web site according to the present invention.
Figure 6:
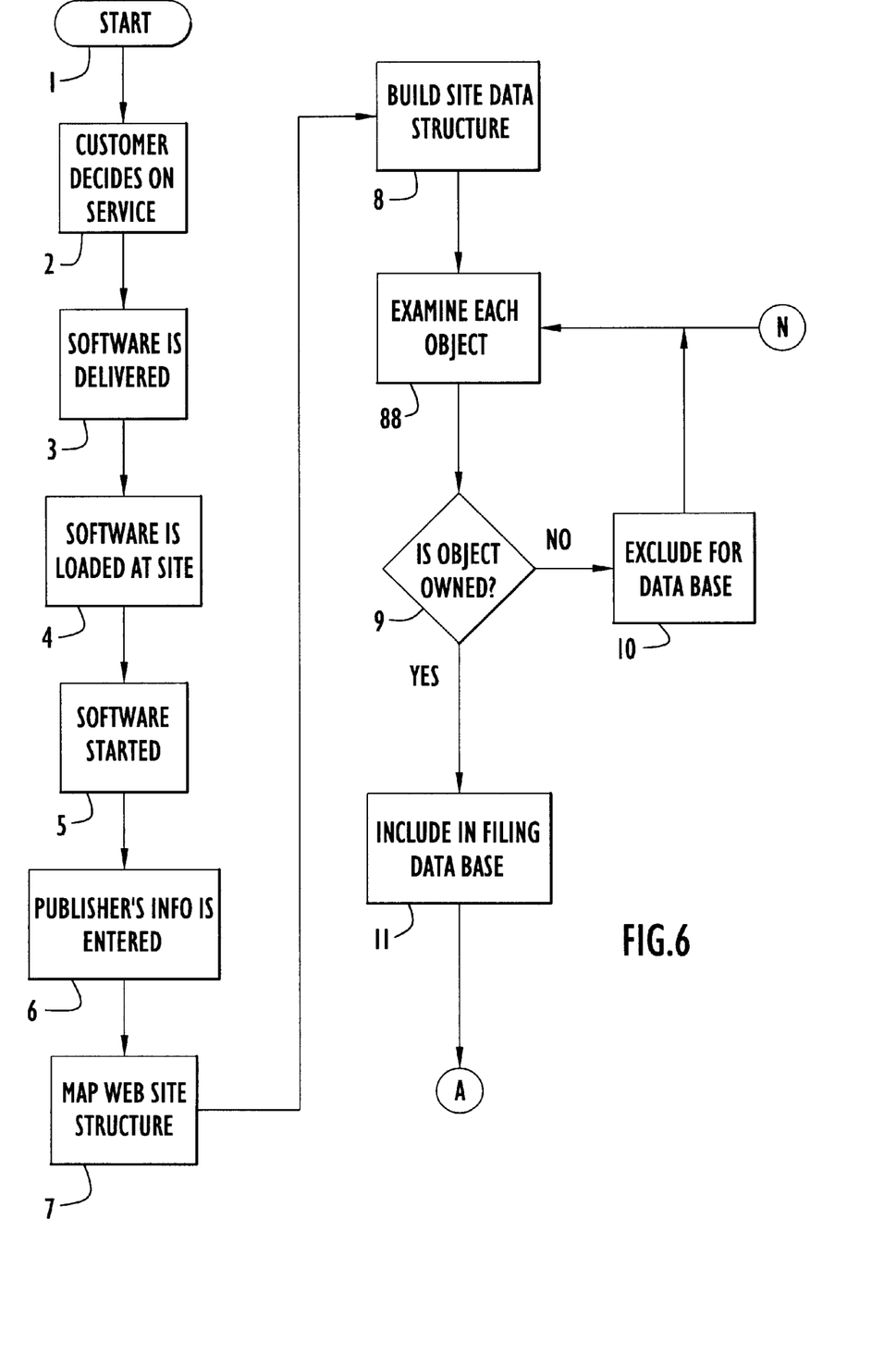
FIGS. 6–11 are a procedural flow chart illustrating the web site processing performed by the registration computer system according to the present invention.
Figure 7:
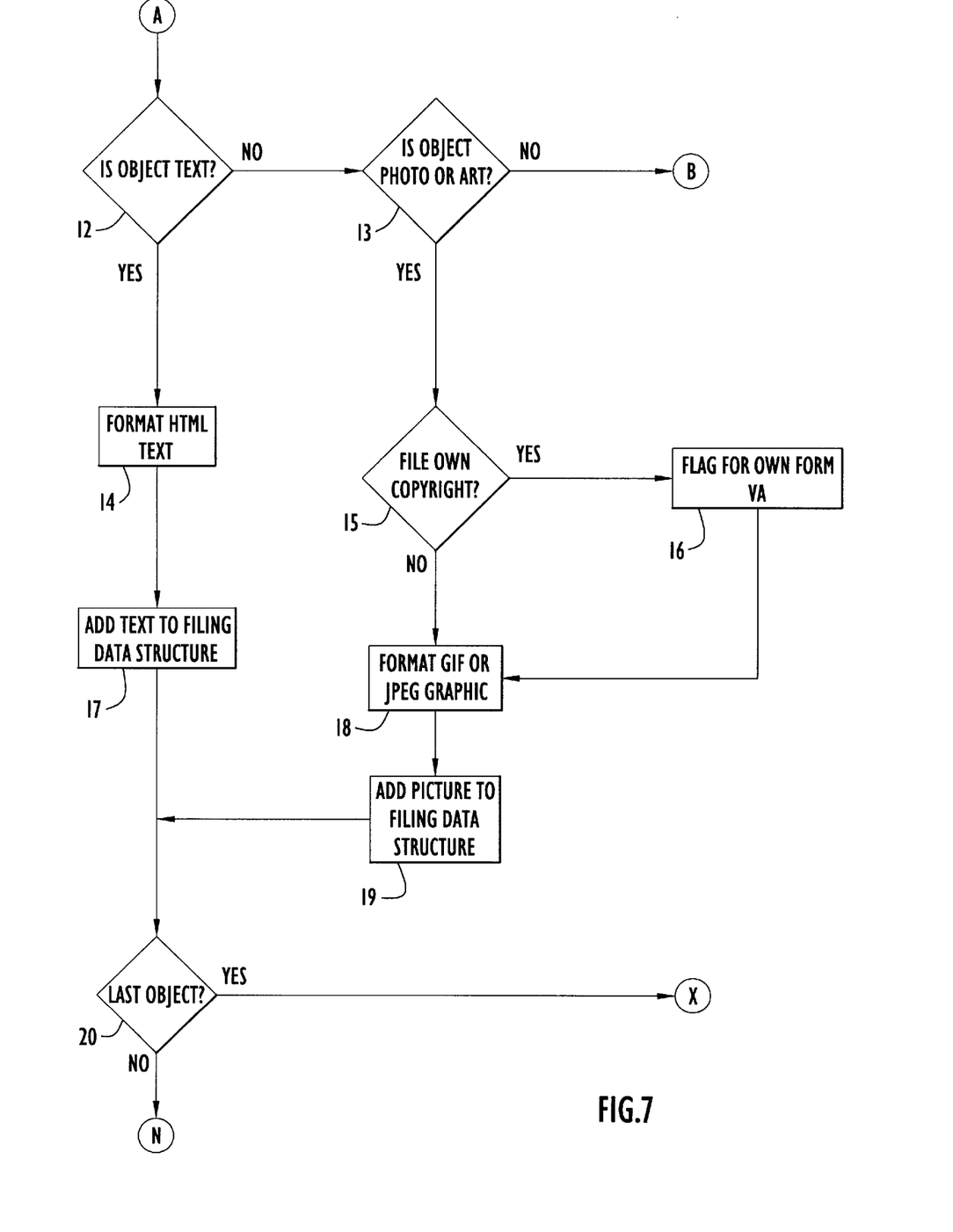
Figure 8:
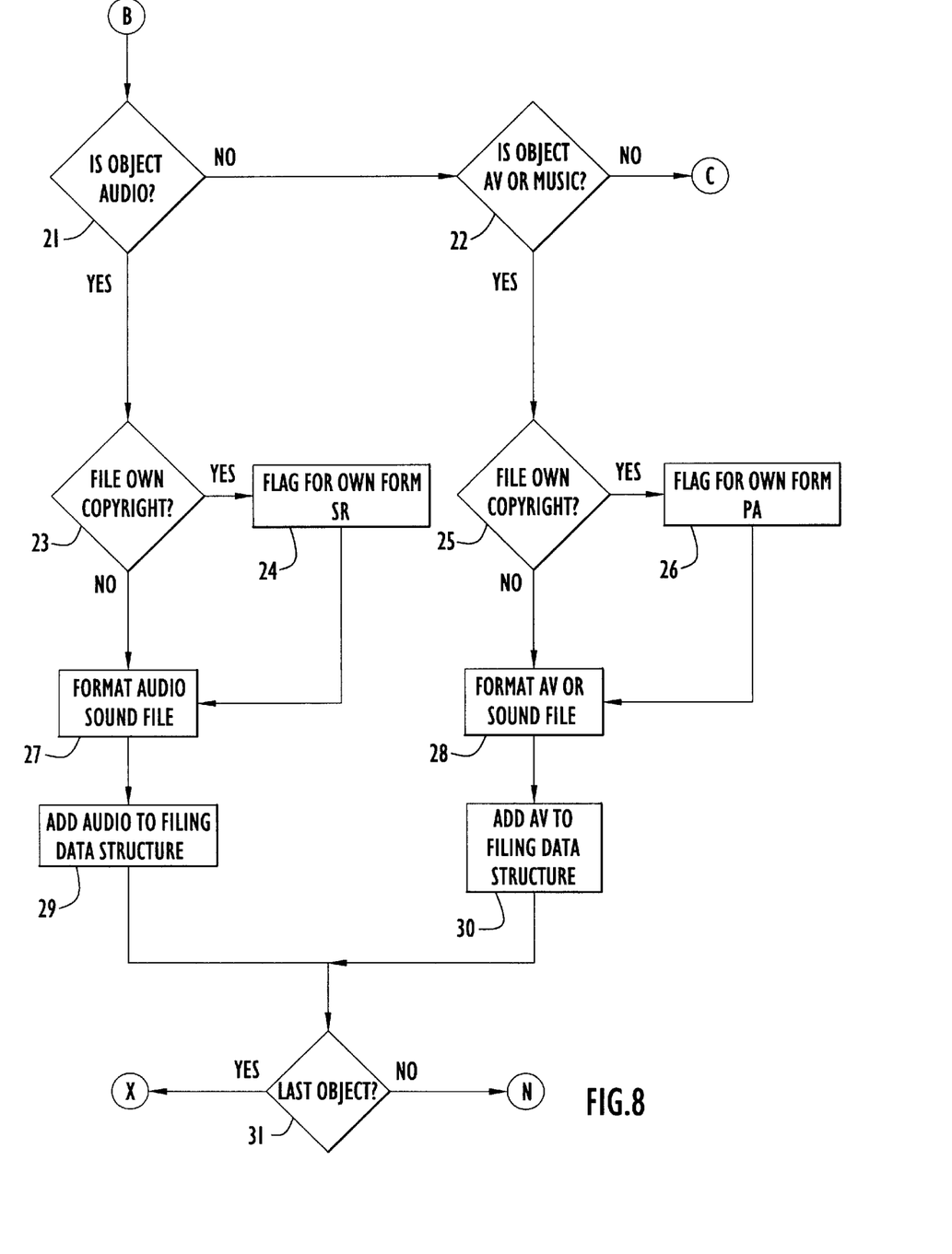
Figure 9:
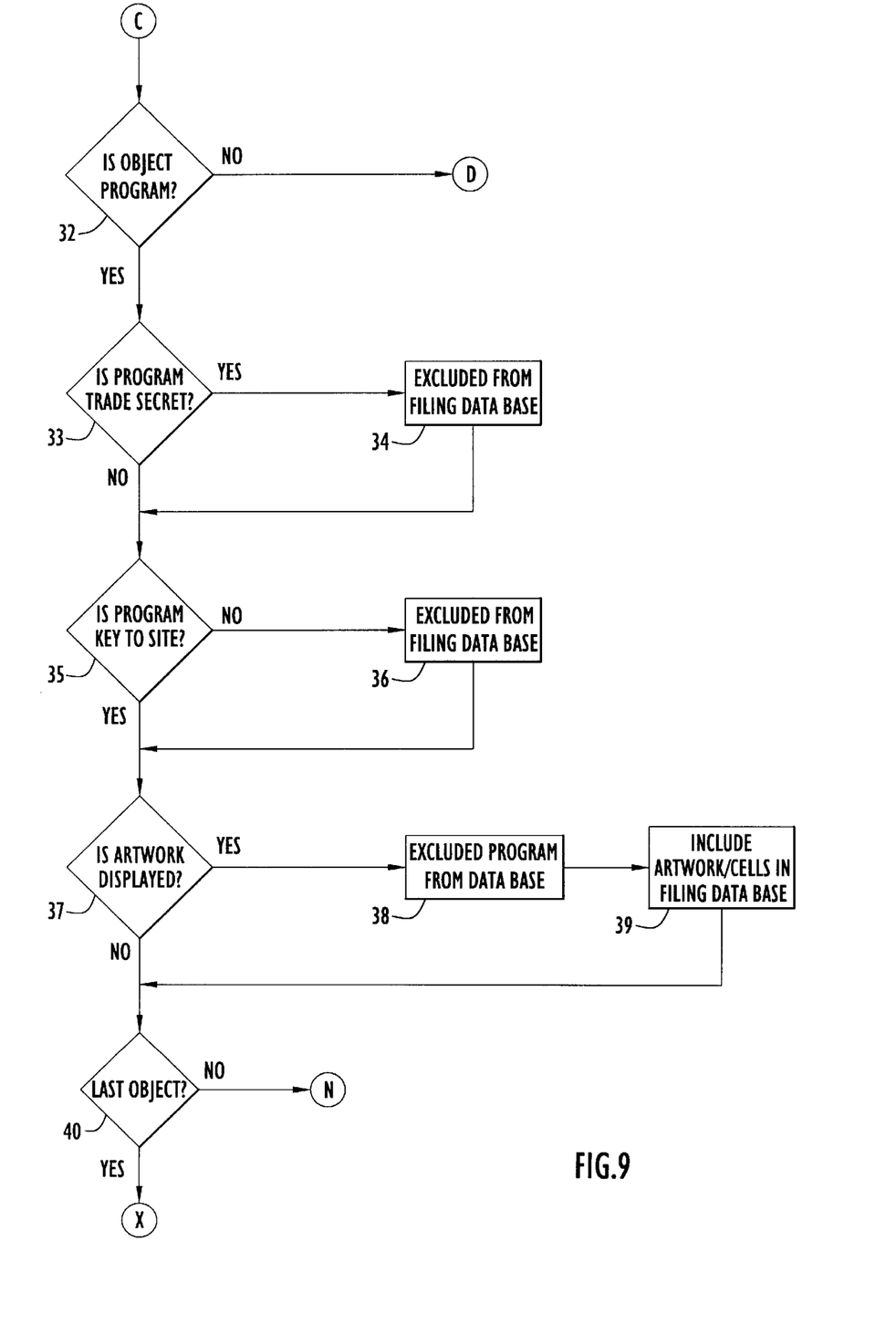
Figure 10:
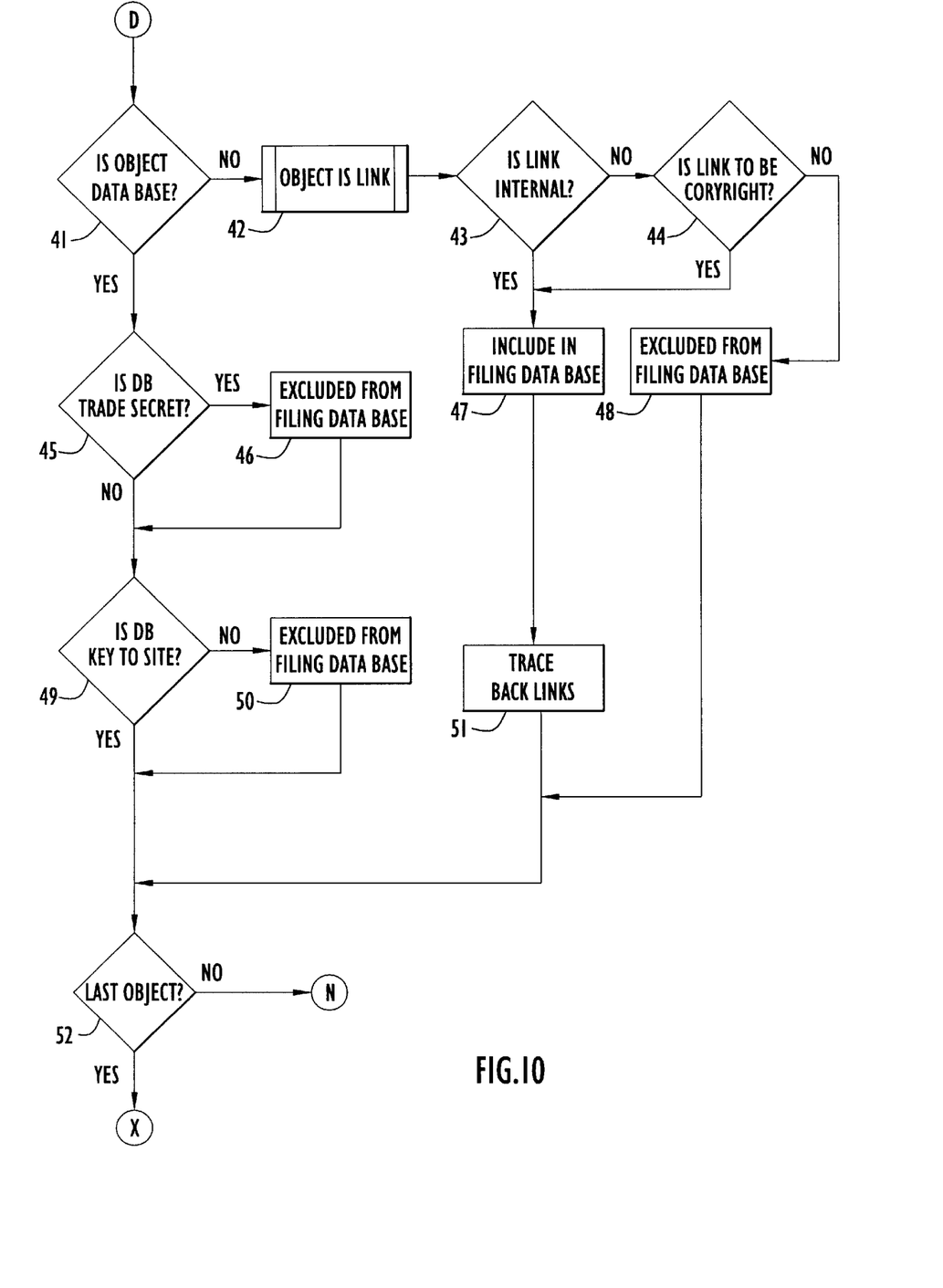
Figure 11:
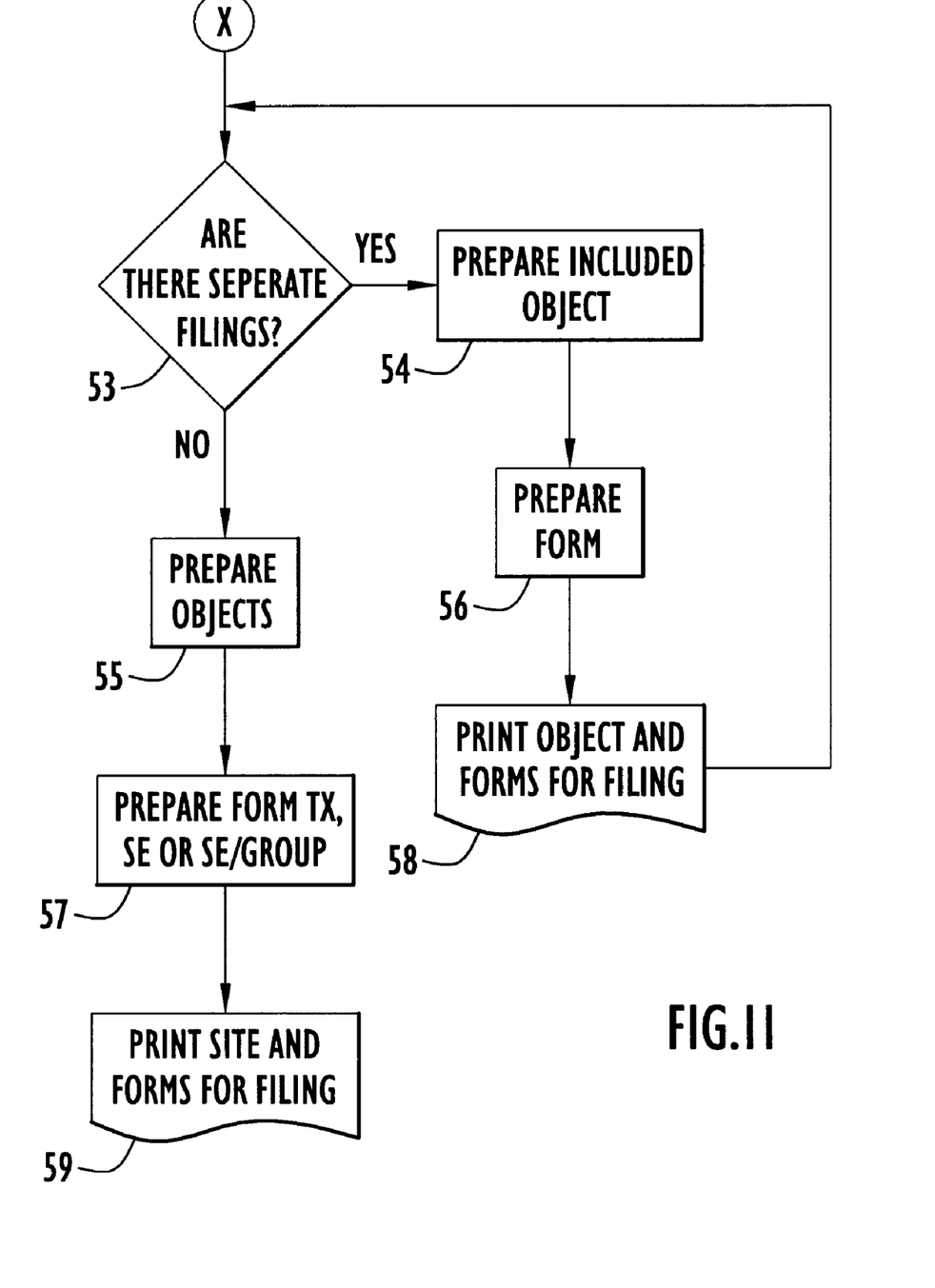

In Object Oriented Programming (OOP), the data and the data processing are stored as a single set of computer instructions. In other words, the data type and the processing instructions are merged. This feature enables creation of Client-Server applications, such as the Web. An exemplary data structure 92 for the web site having a hierarchical structure is illustrated in FIG. 5. Specifically, the top structure 94 is the web site object for the entire site. As shown in FIG. 5 and the Gane/Sarson Outline below, the web site data structure includes a master copyright object 96, an HTML list 98 of all the HTML components 102 (e.g., individual web pages or HTML files, and files specified in the tags within the HTML files) in the site, and the sub-filing list 100 of individual web site components eligible for copyright registration. The copyright object 96 contains information necessary to complete and file the correct form with the appropriate authority (e.g., the Copyright Office), while the HTML object 102 includes the type and other related information necessary for filing and formatting the HTML component. Further, HTML object 102 includes information related to the component format that is to be filed with the appropriate authority (e.g., the Copyright Office), such as source code, graphics or both depending on the authority's (e.g., the Copyright Office) policy. The key element of the HTML object is the "Print Out" element shown below in the Gane/Sarson outline. This element or flag indicates whether the form (i.e., appearance or image produced from a file), content (i.e., actual content of file) or both form and content of the HTML component are necessary for submission to the appropriate authority (e.g., the Copyright Office) in order to register the web site or individual component. For example, a digital photograph typically utilized by a web site includes a series of bytes that do not represent the image when viewed by human eyes. Therefore, a copy of the source file containing the photograph is of little use for registering the photograph for copyright. However, the graphics or printed image of the photograph is typically filed since the graphics show the actual photograph image. The "Print Out" element of the HTML object containing the digital photograph information is set to indicate that the graphics is to be output for copyright registration. In the case where the digital photograph contains a watermark that is not visible to the human eye, it is necessary to file both the source file and graphics for copyright registration. The "Print Out" element of the HTML object containing the digital photograph information is set to indicate that both the source file and graphics are to be output for copyright registration. The system examines the "Print Out" element of each HTML object and produces the graphics or source file for the copyright registration as described below for FIGS. 6–11. Each object that is individually filed for copyright registration in list 100 includes its own copyright and HTML objects 104, 106, respectively. The Gane/Sarson web site data structure outline for the web site, copyright, and HTML objects is illustrated below.

---

Web Site Object

Copyright Object
    HTML Object List
    Sub Filing Object List
        Copyright Object
        HTML Object Copyright Object     Ownership
        Name
        Address
    Type of Work
        TX
        VA
        PA
        SR
        SE
        SE/GROUP
    Nature of Authorship
        text, artwork, sound recording, audiovisual
    Date of Publication
    Published or Unpublished Work
        Published Site HTML Objects     File Location
    Ignore Flag
    Types
        Text
        Artwork
        Photograph
        Database
        Link
        Program
            Java Applet
            Xactive
    Creation Date
    Modification Date
    Ownership
    Links (Internal)
        To
        From -continued Copyright Filing Indicator
   Print Out
      Source
      Graphics A procedural flowchart showing the operation of, and web site processing by, the registration computer system is illustrated in FIGS. 6–11. Specifically, the process begins at steps 1, 2 when an end user decides to register their web site with the appropriate authority (e.g., the Copyright Office). The end user downloads (e.g., via carrier signals) or receives via shipment a copy of the registration software on electronic media at step 3. The software is loaded into the end-user's computer system where their web site (i.e., the web site files) is stored or accessible at step 4, wherein the software is subsequently executed at step 5. The web site publisher (i.e., owner) enters all the relevant web site information necessary to file the web site with the appropriate authority (e.g., the Copyright Office) at step 6 (i.e., the information included in the copyright object of the web site data structure described above). The computer system via software examines the web site to ascertain the web site structure (i.e., the nodes and HTML files in FIG. 3) and identify web site components (i.e., examine the HTML tags in the web site files) to build the web site data structure (FIG. 5) at steps 7, 8. The web site is similar in structure to an inverted tree since the structure has to start with an index or home page (FIG. 3) and expand from that initial node. Once the whole web site structure is defined, each object (i.e., node and component) within the web site structure is processed in turn for relevant characteristics at steps 88, 12, 13, 21, 22, 32, 41 and 42 described below.

Initially, each object within the web site structure is examined within an object loop (i.e., a series of computer instructions that are repeated for each object) to determine object ownership at steps 88, 9. If an object is owned by a third party, it is excluded from copyright registration filing (i.e., by setting the "Ignore Flag" element in the HTML object data structure as described above) at step 10, but if the object is owned by the web site publisher, the object is included for registration filing at step 11. Subsequent to the ownership examination, the computer system determines the object type of the web site object (e.g., text, a photograph, an audio type (i.e., sound recording), an AV (i.e., audio-visual) type, a computer program, a database, or a link) by examining the tags of the web site HTML files and/or extensions of the media files as described above. Upon determining a web site object to be text at step 12, the HTML text for that object is formatted (i.e., the "Print Out" element is determined as described above) for printer output at step 14 and incorporated into the filing data structure (FIG. 5) at step 17. After processing the text object, the next web site object is retrieved for processing at step 20.

When the computer system determines that an object is a photograph or artwork at step 13, the web site publisher determines at step 15 whether or not to file for a copyright registration for the photograph as part of, or separately from (e.g., form VA), the web site. The publisher enters the decision into the computer system in response to a displayed inquiry in substantially the same manner described above. When a separate filing is desired, a flag is set (i.e., the "Copyright Filing Indicator" element of the HTML object described above) at step 16 to indicate that a separate form (e.g., form VA) is to be generated. Subsequent to the decision, the GIF or JPEG graphic file (e.g., as described in Table II) containing the photograph is formatted for printer output (i.e., the "Print Out" element is determined as described above) at step 18 and incorporated into the filing data structure at step 19. After processing the photograph object, the next web site object is retrieved for processing at step 20.

Upon the computer system determining that an object is a sound recording (i.e., an audio type) at step 21, the publisher determines at step 23 whether or not to file for a copyright registration for the sound recording as part of, or separately from (e.g., form SR), the web site. The publisher enters the decision into the computer system in response to a displayed inquiry in substantially the same manner described above. When a separate filing is desired, a flag is sel (i.e., the "Copyright Filing Indicator" element of the HTML object described above) at step 24 to indicate that a separate form (e.g., form SR) is to be generated. Subsequent to the decision, the audio file containing the sound recording is formatted (i.e., the "Print Out" element is determined as described above) for printer output at step 27, and incorporated into the filing data structure at step 29. After processing the audio object, the next web site object is retrieved for processing at step 31.

Similarly, when the computer system determines that an object type is audio-visual or music at step 22, the publisher determines at step 25 whether or not to file for a copyright registration for the audio-visual object as part of, or separately from (e.g., form PA), the web site. The publisher enters the decision into the computer system in response to a displayed inquiry in substantially the same manner described above. When a separate filing is desired, a flag is set (i.e., the "Copyright Filing Indicator" element of the HTML object described above) at step 26 to indicate that a separate form (e.g., form PA) is to be generated. Subsequent to the decision, the audio-visual object file is formatted (i.e., the "Print Out" element is determined as described above) for printer output at step 28, and incorporated into the filing data structure at step 30. After processing the audio-visual object, the next web site object is retrieved at step 31.

Upon the computer system determining that an object is a computer program at step 32, the publisher determines whether or not to include the program for copyright registration filing. In particular, the publisher may decide at step 33 that the development of the program is proprietary and should be protected as a trade secret, and therefore, excluded from filing at step 34 (i.e., the "Ignore Flag" element of the HTML object data structure is set as described above). Further, the publisher may determine at step 35 that the program is not key to the web site or is of a utility nature, and therefore, excluded from filing at step 36 (i.e., the "Ignore Flag" element of the HTML object data structure is set as described above). The publisher enters the exclusion decisions into the computer system in response to displayed inquiries in substantially the same manner described above. Moreover, if it is determined at step 37 that the program displays artwork that is not of a utility nature (e.g., origination animation), the program itself is excluded from filing (i.e., the "Ignore Flag" element of the HTML object data structure is set as described above) at step 38, but the artwork is included for filing at step 39. After processing the program, the program and artwork, if not excluded from filing as described above, are incorporated into the filing data structure, and the next web site object is retrieved for processing at step 40.

Similarly, when the computer system determines that an object is a database at step 41, the publisher determines whether or not to include the database for copyright registration filing. In particular, the publisher may determine at step 45 that the development of the database is proprietary and should be protected as a trade secret, and therefore, excluded from filing (i.e., the "Ignore Flag" element of the HTML object data structure is set as described above) at step 46. Further, the publisher may determine at step 49 that the database is not key to the web site or is of a utility nature, and therefore, excluded from filing (i.e., the "Ignore Flag" element of the HTML, object data structure is set as described above) at step 50. The publisher enters the exclusion decisions into the computer system in response to displayed inquiries in substantially the same manner described above. After processing the database, the database, if not excluded from filing as described above, is incorporated into the filing data structure, and the next web site object is retrieved for processing at step 52.

Upon the computer system determining that an object is a link at step 42 (i.e., if an object is not determined to be any of the foregoing types, the computer system assumes the object to be a link by default), the computer system further determines at step 43 whether or not the link is internal to the web site. This is accomplished by examining the location of the destination file contained in an HTML link tag. Internal links are included for filing and incorporated into the filing data structure at step 47. For an external link, the publisher determines at step 44 whether or not to include the link for copyright registration filing. The publisher enters the decision into the computer system in response to a displayed inquiry in substantially the same manner described above. When the link is to be included in the filing, the link is incorporated into the filing data structure at step 47 as described above; otherwise the link is excluded from filing (i.e., the "Ignore Flag" element in the HTML object data structure is set as described above) at step 48. Subsequent to inclusion of the link, the computer system traces the link at step 51 to ensure information accuracy. After processing the link, the next web site object is retrieved for processing at step 52.

Subsequent to the computer system processing the last web site object, the web site is formatted for filing. When the computer system determines at step 53 that there are separate filings for internal web site objects (i.e., the "Copyright Filing Indicator" element of the HTML object has been set and objects exist in sub-filing list 100 (FIG. 5) as described above), each object file is formatted (i.e., the "Print Out" element is examined to produce the correct output for filing as described above) at step 54 and the proper copyright registration form is generated at step 56. After the object files and forms for separate filings are prepared, the files and forms are printed for filing at step 58. Once the separate filings are complete, the web site filing is prepared for objects included in the filing (i.e., the "Ignore Flag" element has not been set). In particular, the web site object files containing the various media are formatted (i.e., the "Print Out" element is examined to produce the correct output for filing as described above) at step 55 with the proper copyright registration forms (e.g., if this is a one time filing then a Form TX is typically prepared, if a serial filing then a Form SE is typically prepared and if a group from a series is being filed, then a Form SE/Group is typically prepared) generated at step 57. After the web site objects and forms are prepared, they are printed for filing at step 59.

The copyright registration software is implemented in the 'C' programming language, however, the software may be developed in any of a number of high or low level computing languages. Basically, there are two main procedures that the software performs. First, the software, via the computer system, examines the web site itself to ascertain the web site structure (FIG. 3) and identify the web site components within the web site files as described above. This task can be performed by high level programming languages, such as 'C' or 'C++', and other utility languages that are oriented towards system management input/output tasks (e.g., Perl). Once all the components or objects are encountered in a web site, the computer system determines, with publisher assistance as described above, the objects eligible for copyright registration. This calls for building a database or data structure that is well suited for the 'C' or 'C++' computer languages. The software may utilize a data structure to store the filing information as described above, or use a database wherein an object oriented programming language includes calls to the database as part of the object declaration in the software (i.e., the computer instructions representing the calls are merged with the data or structure type as described above). Alternatively, since other computer languages have the ability to make external database calls, software can be designed in a manner to function in conjunction with an external database, such as SQL, to store the filing information. Further, the software may be designed in a manner to interface and be initiated from a Java program since Java is platform independent, includes the capabilities described above, and is designed specifically for the Internet. It is to be understood that the registration software may be developed in any of the above described or other suitable computer languages by one of ordinary skill in the art based on the functional description in the specification and the flow chart and data structures illustrated in the drawings.

It will be appreciated that the embodiments described above and illustrated in the drawings represent only a few of the many ways of implementing a web site copyright registration system and method.

The present invention is not to be limited to copyright registration of web sites, but may be utilized for copyright registration of various other works that are eligible for copyright protection in substantially the same manner described above. For example, the user may enter the copyright information into the system via line prompts, a dialog box or form as described above, and the system generates the appropriate completed copyright registration forms to register the work for copyright protection. The system may further (e.g., via software) examine computer readable forms the same manner described above, or be utilized to generate completed copyright registration forms for works not in a computer readable form based on user input. Further, the present invention may generate any appropriate completed copyright registration forms for the U.S. or any other country, and is not to be limited to the specific forms or copyright authorities disclosed herein.

The present invention may be implemented by a user's computer system, or the user's computer system in combination with any quantity of server or host systems residing on the web or in communication with the user's computer system. The server or host systems may perform the web site processing as described above, while the user communicates with the server or host systems through the web browser or other software on the user computer system. The user essentially visits the server or host site via the web browser on the user's computer system or communicates with the server or host system via modem or other communication device, and initiates the registration procedure wherein generated copyright registration forms and associated materials may be downloaded from the server or host systems to the user computer system for printing or storage. The server or host systems may be implemented by any conventional or other processing systems, and include software written in any suitable computer language enabling the server to process the web site or works in substantially the same manner described above.

The computer system may be implemented by any conventional or other processing system having the capacity and storage to execute the copyright registration software. The software may be implemented in any suitable computer language, while the user input may be entered via keyboard, mouse, voice recognition, touch screen or any other input device. Further, the line prompts, dialog boxes and forms may be arranged in any fashion and have any layout or configuration. Moreover, any type of input mechanism may be utilized to retrieve information from a user, such as menus, windows or graphical user interfaces (GUI). The data structures or databases may be implemented by any data or storage structures or storage devices capable of storing information required for copyright registration.

The software logic or algorithm may be arranged in any manner capable of producing the completed copyright registration forms and associated materials. The computer system may examine the web site or work in any fashion capable of extracting the relevant copyright information and determining the structure of the work and the types of works of the work components. The software may be delivered to a user via any suitable medium, such as CD-ROM, diskette, downloaded from the Internet or a bulletin board (e.g., via carrier signals) or other transfer mechanism. The software may be installed and executed on a computer system in any conventional or other manner (e.g., an install program, copying files, entering an execute command). The software may be implemented to be compatible with any operating system, and the computer system may format the generated copyright registration forms and associated materials for printing or transfer to diskette, CD-ROM, communication device or any other output or communication media.

From the foregoing description it will be appreciated that the invention makes available a novel web site copyright registration system and method wherein a computer system examines a web site or other work and automatically generates completed copyright registration forms and associated materials to register the web site for copyright protection.

Having described preferred embodiments of a new and improved web site copyright registration system and method, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A computer system to automatically generate completed copyright registration forms and associated materials to register a copyright for a work, said computer system comprising:
   input means for facilitating user entry of copyright registration form information associated with the work into said computer system;
   entry means for receiving the form information associated with the work from said input means;
   examination means for examining the work in computer readable form to identify individual work components contained within the work and to ascertain component information relating to the identified work components;
   work selection means for facilitating user selection of identified work components for inclusion in the work copyright registration;
   memory means for storing the form information and component information and information corresponding to said user selection of identified work components; and
   work registration form means for generating, based on the information stored in said memory means, the appropriate completed copyright registration forms and associated materials to register the work for copyright protection.

2. The system of claim 1 wherein:
   said work selection means includes component selection means for facilitating user selection of identified work components for individual copyright protection;
   said memory means includes component memory means for storing information corresponding to said user selection of identified work components via said component selection means; and
   said work registration form means includes component registration form means for generating, based on the information stored in said memory means, the appropriate completed copyright registration forms and associated materials to individually register for copyright protection the identified work components selected via said component selection means.

3. The system of claim 1 wherein said work includes a web site.

4. The system of claim 2 wherein said memory means includes a database to store the form information and component information and the information corresponding to said user selection of identified work components via said work selection means and said component selection means.

5. The system of claim 2 wherein the associated materials include a copy of each identified work component selected via said work selection means and said component selection means, and said work registration form means further includes:
   work format means for formatting, based on the information stored in said memory means, each identified work component selected via said work selection means to produce a copy of that work component in the proper format to register the work for copyright protection;
   component format means for formatting, based on the information stored in said memory means, each identified work component selected via said component selection means to produce a copy of that work component in the proper format to individually register the work component for copyright protection; and
   output means for transferring the generated copyright registration forms and copies of the identified work components selected via said work selection means and component selection means to an output medium.

6. A program product apparatus having a computer readable medium with computer program logic recorded thereon for facilitating generation of completed copyright registration forms and associated materials to register a copyright for a work, said program product apparatus comprising:
   entry means for receiving copyright registration form information associated with the work entered into a computer system by a user via an input device;
   examination means for examining a computer readable form of the work to identify individual work components contained within the work and to ascertain component information relating to the identified work components;
   work selection means for facilitating user selection of identified work components for inclusion in the work copyright registration;
   storing means for storing in a memory the form and component information and information corresponding to said user selection of identified work components; and work registration form means for generating, based on the information stored in said memory, the appropriate completed copyright registration forms and associated materials to register the work for copyright protection.

7. The apparatus of claim 6 wherein:

said work selection means includes component selection means for facilitating user selection of identified work components for individual copyright protection;

said storing means includes component storing means for storing in said memory information corresponding to said user selection of identified work components via said component selection means; and said work registration form means includes component registration form means for generating, based on the information stored in said memory, the appropriate completed copyright registration forms and associated materials to individually register for copyright protection the identified work components selected via said component selection means.

8. The apparatus of claim 6 wherein said work includes a web site.

9. A carrier signal having computer program logic embedded therein for facilitating generation of completed copyright registration forms and associated materials to register a copyright for a work, said carrier signal comprising:

entry means for receiving copyright registration form information associated with the work entered into a computer system by a user via an input device;

examination means for examining a computer readable form of the work to identify individual work components contained within the work and to ascertain component information relating to the identified work components;

work selection means for facilitating user selection of identified work components for inclusion in the work copyright registration;

storing means for storing in a memory the form and component information and information corresponding to said user selection of identified work components; and work registration form means for generating, based on the information stored in said memory, the appropriate completed copyright registration forms and associated materials to register the work for copyright protection.

10. The carrier signal of claim 9 wherein:

said work selection means includes component selection means for facilitating user selection of identified work components for individual copyright protection;

said storing means includes component storing means for storing in said memory information corresponding to said user selection of identified work components via said component selection means; and said work registration form means includes component registration form means for generating, based on the information stored in said memory, the appropriate completed copyright registration forms and associated materials to individually register for copyright protection the identified work components selected via said component selection means.

11. The carrier signal of claim 9 wherein said work includes a web site.

12. A method for automatically generating, via a computer system, completed copyright registration forms and associated materials to register a copyright for a work wherein the computer system includes an input device and memory, said method comprising the steps of:

(a) receiving copyright registration form information associated with the work entered into the computer system by a user via the input device;

(b) examining the work in computer readable form, via the computer system, to identify work components contained within the work and to ascertain component information relating to the identified work components;

(c) facilitating user selection of identified work components for inclusion in the work copyright registration via said input device;

(d) storing in the memory, via the computer system, the form and component information and information corresponding to said user selection of identified work components; and (e) generating, via the computer system based on the information stored in the memory, the appropriate completed copyright registration forms and associated materials to register the work for copyright protection.

13. The method of claim 12 wherein step (c) further includes:

(c.1) facilitating user selection of identified work components for individual copyright protection via the input device;

step (d) further includes:

(d.1) storing in the memory, via the computer system, information corresponding to said user selection of identified work components for individual copyright protection; and step (e) further includes:

(e.1) generating, via the computer system based on the information stored in the memory, the appropriate completed copyright registration forms and associated materials to register for copyright protection the identified work components selected for individual copyright protection.

14. The method of claim 12 wherein the work includes a web site.

15. The method of claim 13 wherein the memory includes a database, and step (d.1) further includes:

(d.1.1) storing in the database, via the computer system, the form and component information and information corresponding to the identified work components selected for inclusion in the work copyright registration and selected for individual copyright protection.

16. The method of claim 13 wherein the associated materials include a copy of each identified work component selected for inclusion in the work copyright registration and selected for individual copyright protection, and step (e) further includes:

(e.1) formatting, via the computer system based on the information stored in the memory, each identified work component selected for inclusion in the work copyright registration to produce a copy of that work component in the proper format to register the work for copyright protection;

(e.2) formatting, via the computer system based on the information stored in the memory, each identified work component selected for individual copyright protection to produce a copy of that work component in the proper format to individually register the work component for copyright protection; and (e.3) transferring to an output medium from the computer system the generated copyright registration forms and copies of the identified work components selected for inclusion in the work copyright registration and selected for individual copyright protection.

17. A method for facilitating generation of completed copyright registration forms and associated materials to register a copyright for a work, said method comprising the step of:

(a) storing computer program logic on a computer readable medium wherein said computer program logic includes entry means for receiving copyright registration form information associated with the work entered into a computer system by a user via an input device; examination means for examining a computer readable form of the work to identify individual work components contained within the work and to ascertain component information relating to the identified work components; work selection means for facilitating user selection of identified work components for inclusion in the work copyright registration; storing means for storing in a memory the form and component information and information corresponding to said user selection of identified work components; and work registration form means for generating, based on the information stored in the memory, the appropriate completed copyright registration forms and associated materials to register the work for copyright protection.

18. The method of claim 17 wherein step (a) further includes:

(a.1) storing said work selection means on the computer readable medium wherein said selection means for facilitating user selection of identified work components for individual copyright protection, said storing means includes component storing means for storing in the memory information corresponding to said user selection of identified work components via said component selection means, and said work registration form means includes component registration form means for generating, based on the information stored in the memory, the appropriate completed copyright registration forms and associated materials to individually register for copyright protection the identified work components selected via said component selection means.

19. The method of claim 17 wherein the work includes a web site.

20. A method for facilitating generation of completed copyright registration forms and associated materials to register a copyright for a work, said method comprising the step of:

(a) embedding computer program logic within a carrier signal wherein said computer program logic includes entry means for receiving copyright registration form information associated with the work entered into a computer system by a user via an input device; examination means for examining a computer readable form of the work to identify individual work components contained within the work and to ascertain component information relating to the identified work components; work selection means for facilitating user selection of identified work components for inclusion in the work copyright registration; storing means for storing in a memory the form and component information and information corresponding to said user selection of identified work components; and work registration form means for generating, based on the information stored in the memory, the appropriate completed copyright registration forms and associated materials to register the work for copyright protection.

21. The method of claim 20 wherein step (a) further includes:

(a.1) embedding said work selection means within the carrier signal wherein the work selection means includes component selection means for facilitating user selection of identified work components for individual copyright protection, said storing means includes component storing means for storing in the memory information corresponding to said user selection of identified work components via said component selection means, and said work registration form means includes component registration form means for generating, based on the information stored in the memory, the appropriate completed copyright registration forms and associated materials to individually register for copyright protection the identified work components selected via said component selection means.

22. The method of claim 20 wherein the work includes a web site.

* * * * *